(12) United States Patent
Renaudier et al.

(10) Patent No.: US 9,397,755 B2
(45) Date of Patent: Jul. 19, 2016

(54) CLOCK RECOVERY METHOD FOR ULTRA DENSE WDM SYSTEMS

(71) Applicant: Alcatel Lucent, Boulogne Billancourt (FR)

(72) Inventors: Jeremie Renaudier, Nozay (FR); Gabriel Charlet, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/380,424

(22) PCT Filed: Mar. 21, 2013

(86) PCT No.: PCT/EP2013/055996
§ 371 (c)(1),
(2) Date: Aug. 22, 2014

(87) PCT Pub. No.: WO2013/149847
PCT Pub. Date: Oct. 10, 2013

(65) Prior Publication Data
US 2015/0063813 A1    Mar. 5, 2015

(30) Foreign Application Priority Data
Apr. 3, 2012 (EP) .................... 12305400

(51) Int. Cl.
*H04J 14/02* (2006.01)
*H04B 10/54* (2013.01)
(Continued)

(52) U.S. Cl.
CPC .......... *H04B 10/541* (2013.01); *H04B 10/2575* (2013.01); *H04B 10/5161* (2013.01);
(Continued)

(58) Field of Classification Search
CPC ............. H04B 10/541; H04B 10/2575; H04B 10/5561; H04J 14/02
See application file for complete search history.

(56) References Cited

U.S. PATENT DOCUMENTS

| 4,972,408 A | 11/1990 | Le Bihan Herve et al. |
| 2003/0025957 A1* | 2/2003 | Jayakumar ............. H04B 10/00 398/5 |

(Continued)

FOREIGN PATENT DOCUMENTS

| JP | 2008010971 | 1/2008 |
| JP | 2010109705 | 5/2010 |

(Continued)

OTHER PUBLICATIONS

Arikawa, M. et al; Signal Monitoring Techniques with Digital Spectrum Processing Using Pseudo-Return-to-Zero Modulation; The Institute of Electronics, Information and Communication Engineers; IEICE Technical Report; OCS2010-31 (Jul. 2010); 2010; pp. 41-46.

(Continued)

*Primary Examiner* — Dzung Tran
(74) *Attorney, Agent, or Firm* — Patti & Malvone Law Group, LLC

(57) ABSTRACT

An exemplary method and apparatus are provided for high efficiency wavelength division multiplexing (WDM) optical communication systems. An optical transmitter adapted to transmit an optical signal on an optical WDM transmission channel to a corresponding optical receiver is described. The optical transmitter comprises a symbol generation unit adapted to convert input data into a sequence of data symbols at a symbol rate B; with B being a real number greater zero; an amplitude modulation unit adapted to modulate an amplitude of every $N^{th}$ data symbol in a sequence derived from the sequence of data symbols, thereby creating a modulated sequence of data symbols; wherein N is an integer; wherein N>2; and a digital-to-optical converter adapted to convert a sequence derived from the modulated sequence of data symbols into an optical signal to be transmitted to the optical receiver.

15 Claims, 7 Drawing Sheets

(51) Int. Cl.
*H04B 10/516* (2013.01)
*H04L 7/00* (2006.01)
*H04L 7/06* (2006.01)
*H04B 10/556* (2013.01)
*H04B 10/2575* (2013.01)
*H04J 14/06* (2006.01)

(52) U.S. Cl.
CPC ............ *H04B10/5561* (2013.01); *H04J 14/02* (2013.01); *H04L 7/0075* (2013.01); *H04L 7/06* (2013.01); *H04J 14/06* (2013.01)

(56) References Cited

U.S. PATENT DOCUMENTS

| | | | |
|---|---|---|---|
| 2004/0101311 A1 | 5/2004 | Grohn | |
| 2010/0008679 A1* | 1/2010 | Cole | H04B 10/40 398/185 |
| 2010/0329677 A1 | 12/2010 | Kaneda et al. | |
| 2012/0134676 A1* | 5/2012 | Kikuchi | H04B 10/532 398/65 |
| 2012/0251119 A1* | 10/2012 | McNicol | H04J 14/02 398/91 |

FOREIGN PATENT DOCUMENTS

| | | |
|---|---|---|
| WO | 02/31984 | 4/2002 |
| WO | 2010119576 | 10/2010 |
| WO | 2011083575 | 7/2011 |
| WO | 2011125964 | 10/2011 |

OTHER PUBLICATIONS

Oerder, M. et al; Digital Filter and Square Timing Recovery; IEEE Transactions on Communications, vol. 36, No. 5; May 1988; 0090-6778/88/0500-0605$01.00; 1988 IEEE; pp. 605-612.

Krongold, B. S. et al; Fiber Nonlinearity Mitigation by PAPR Reduction in Coherent Optical OFDM Systems via Active Constellation Extension; ECOC2008, ECOC, Brussels, Sep. 21-25, 2008; ECOC, Brussels Expo, Belgium; Sep. 21, 2008; XP001524640; ISBN: 978-1-4244-2228-9.

* cited by examiner

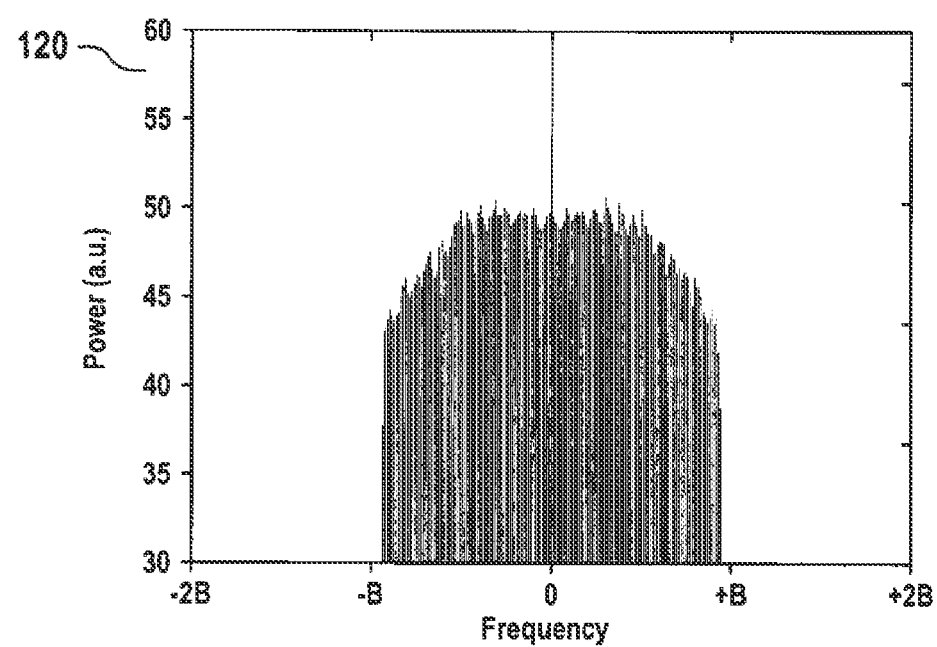

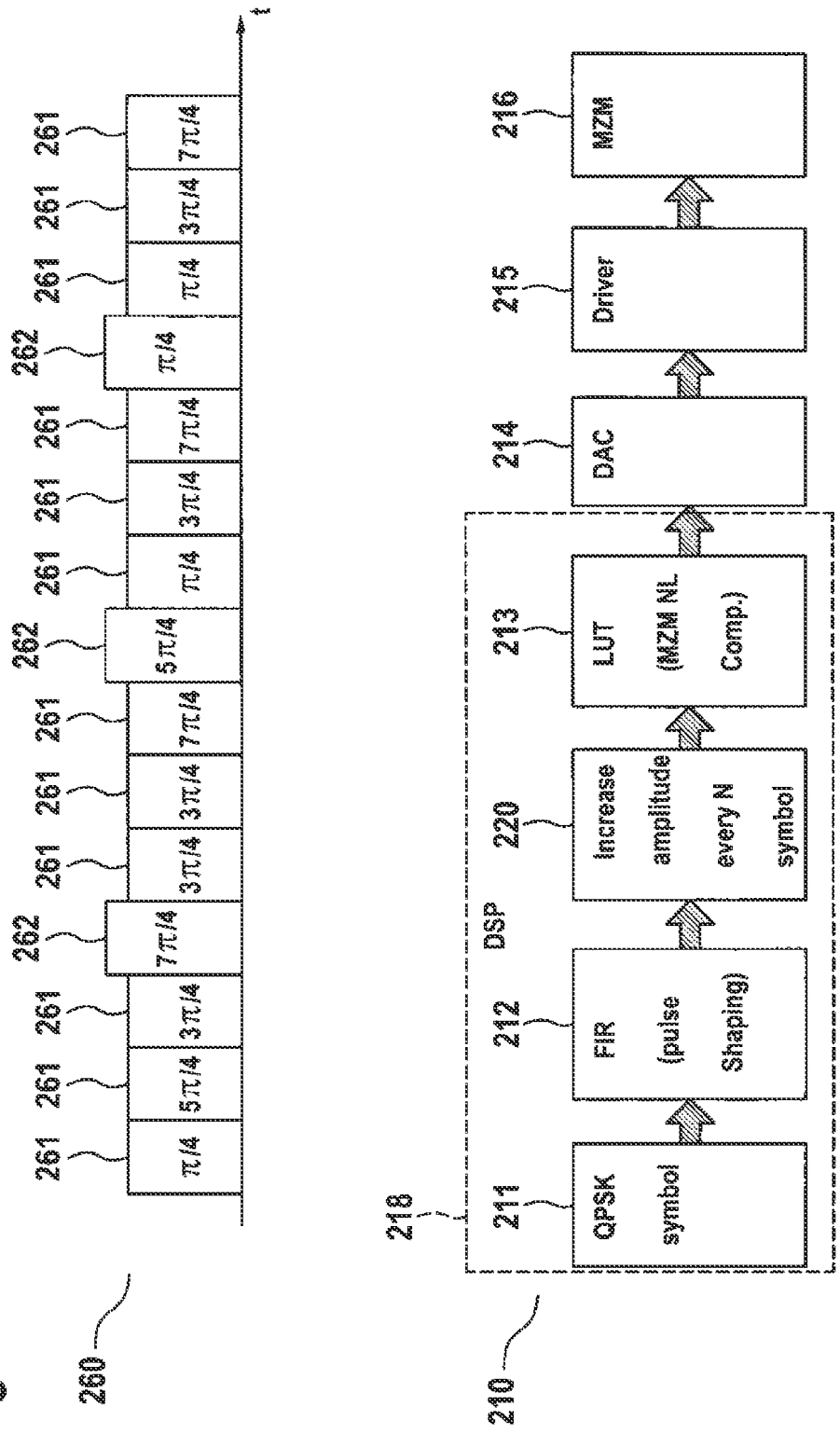

CLOCK RECOVERY METHOD FOR ULTRA DENSE WDM SYSTEMS

TECHNICAL FIELD

The present document relates to optical transmission systems. In particular, the present document relates to high efficiency wavelength division multiplexing (WDM) optical communication systems.

BACKGROUND

Reducing the channel spacing of WDM systems is an efficient way to take full benefit of the optical amplifier bandwidth (which is around 4 THz in current amplifier systems). 100 G systems typically use a symbol rate of 28 Gbaud (PDM-QPSK, Polarization Division Multiplexing—Quadrature Phase Shift Keying) and a channel spacing of 50 GHz. Reducing the channel spacing close to the symbol rate (i.e. reducing the channel spacing close to 28 GHz) is effective in order to increase system capacity (by approximately 50%) with limited transmission reach reduction (by approximately only 10 to 20%). One key challenge in these tight channel spacing configurations is to recover the transmitter clock at the receiver. This is particularly relevant if the transmitted sequences of data symbols are relatively long (as is the case in commercial operation), because the mismatch between the clocks at the transmitter and the receiver increases with time.

WO02/31984A2 describes a method for performing multiple order amplitude modulation. US2004/101311A1 describes a method for the distribution of a synchronization signal in an optical communication system which is inherently asynchronous. U.S. Pat. No. 4,972,408 describes a method of combining and separating a low data rate digital channel with or from the high data rate digital channel of a transmission link.

WO2010/119576A1 describes a method for detecting a skew between parallel light signals generated from a serial data stream.

SUMMARY

The present document addresses the technical problem of clock recovery (also referred to as timing recovery) when using narrow WDM channels, e.g. WDM channels with a channel width or bandwidth D which is close to the symbol rate of the data transmitted over the WDM channels.

According to an aspect, an optical transmitter is described. The optical transmitter is adapted to transmit an optical signal on an optical wavelength division multiplexed (WDM) transmission channel to a corresponding optical receiver. The WDM transmission channel may have a pre-determined bandwidth. The bandwidth may be modified, e.g. on a pre-determined grid having a pre-determined granularity (e.g. 12.5 GHz). The optical transmitter comprises a symbol generation unit adapted to convert input data into a sequence of data symbols at a symbol rate B; with B being a real number greater than zero. The symbol rate B may be in the range of the bandwidth of the WDM transmission channel. In particular, the bandwidth of the WDM transmission channel may be smaller than or equal to the symbol rate B.

The data symbols may comprise respective phases and amplitudes. The phases of the data symbols may correspond to the phases of constellation points of an $M^{ary}$—Phase Shift Keying (M-PSK) modulation scheme; with M being an integer, M>1. By way of example, the phases of the data symbols may correspond to the phases of the constellation points of a Quadrature Phase Shift Keying (QPSK) modulation scheme with M=4. The amplitudes of the data symbols may be constant at a first amplitude.

Furthermore, the optical transmitter may comprise a digital-to-optical converter adapted to convert a sequence derived from the sequence of data symbols into an optical signal to be transmitted to the optical receiver. The sequence derived from the sequence of data symbols may e.g. be substantially identical to the sequence of data symbols. Alternatively, the sequence derived from the sequence of data symbols may correspond to a filtered (e.g. pulse shape filtered) version of the sequence of data symbols.

The optical transmitter is adapted to provide a clock tone at a tone frequency within the optical signal, wherein the tone frequency is B/N, with N being a real number, N>2. The clock tone may be synchronous with the sequence of data symbols. In other words, the tone frequency may have a fixed relationship with the symbol rate. By way of example, N is constant. The clock tone may be inserted into the sequence of data symbols prior to modulating the sequence derived from the sequence of data symbols onto the optical signal. As indicated above, the WDM transmission channel may have a bandwidth D. The tone frequency (i.e. the integer N) may be selected such that it is smaller than half of the channel width D, i.e. B/N<D/2.

The insertion of the clock tone into the sequence of data symbols is achieved by providing a symbol generation unit which comprises an amplitude modulation unit and which is adapted to generate a sequence of data symbols, wherein the amplitudes of the data symbols are constant at the first amplitude, apart from every $N^{th}$ data symbol in the sequence of data symbols having a second amplitude other than the first amplitude, N may be an integer. Alternatively, the symbol generation unit may be adapted to generate a sequence of data symbols, wherein the amplitudes of the data symbols are constant at the first amplitude. Furthermore, the optical transmitter may comprise an amplitude modulation unit adapted to modulate (e.g. to modify) the amplitude of every $N^{th}$ data symbol in a sequence derived from the sequence of data symbols, thereby creating a modulated sequence of data symbols. In such a case, the digital-to-optical converter may be adapted to convert a sequence derived from the modulated sequence of data symbols into the optical signal.

The amplitude of every $N^{th}$ data symbol in the sequence of data symbols or in the sequence derived from the sequence of data symbols may be increased with respect to the first amplitude. A ratio between the first amplitude and the modulated (e.g. increased) amplitude may be adjustable, thereby adjusting a modulation depth and an amplitude of the clock tone, and thereby improving clock recovery at the optical receiver.

The digital-to-optical converter typically comprises a digital-to-analogue converter. The digital-to-analogue converter may be adapted to convert the sequence derived from the modulated sequence of data symbols into an analogue electrical signal. Furthermore, the digital-to-optical converter may comprise an optical modulator adapted to modulate an optical carrier signal with the analogue electrical signal; thereby yielding the optical signal.

The optical transmitter may be adapted to generate a polarization division multiplexed (PDM) optical signal comprising a first polarization component and a second polarization component. In such cases, a clock tone may be inserted in one or both of the polarization components of the PDM optical signal. By way of example, the first polarization components may be modulated with a sequence derived from a first modulated sequence of data symbols and/or the second polarization components may be modulated with a sequence derived from a second modulated sequence of data symbols.

The optical transmitter may comprise a pulse shaping filter. The pulse shaping filter may be positioned upstream of the amplitude modulation unit (i.e. pulse shaping may be performed prior to amplitude modulation). In such cases, the pulse shaping filter may be adapted to filter the sequence of data symbols. The filtered sequence of data symbols may be the sequence derived from the sequence of data symbols which is processed by the amplitude modulation unit. This configuration may be beneficial in order to provide a clock tone with a controlled clock tone amplitude. Alternatively, the pulse shaping filter may be positioned downstream of the amplitude modulation unit (i.e. pulse shaping may be performed subsequent to amplitude modulation). In such cases, the pulse shaping filter may be adapted to filter the modulated sequence of data symbols. This configuration may be beneficial in order to increase the signal-to-noise ratio at the corresponding optical receiver.

According to a further aspect an optical receiver is described. The optical receiver is adapted to receive an optical signal on an optical wavelength division multiplexed (WDM) transmission channel from a corresponding optical transmitter. The optical receiver comprises a reception unit adapted to convert the optical signal received from the optical transmitter into an analogue or digital signal. Typically, the reception unit comprises a coherent detection unit (if the optical receiver is a coherent detector), thereby yielding the analogue signal. Furthermore, the reception unit typically comprises one or more analogue-to-digital converters adapted to convert the analogue signal into a digital signal.

The analogue or digital signal is representative of (or comprises) a sequence of data symbols at a symbol rate B; with B being a real number greater than zero. Furthermore, the analogue or digital signal is representative of a clock tone at the tone frequency of B/N. In particular, the amplitude of every $N^{th}$ data symbol in the sequence of data symbols may be increased; N being a real number (e.g. an integer), N>2. The optical receiver comprises a clock recovery unit adapted to adjust a clock of the optical receiver to a clock of the transmitter, based on a spectrum of the analogue or digital signal at frequencies of substantially −B/N and/or +B/N. In particular, the clock recovery unit may be adapted to apply a filter and square method to spectral components of the analogue or digital signal at the frequencies of substantially −B/N and +B/N.

According to a further aspect, an optical transmission system adapted for WDM transmission is described. The optical transmission system comprises an optical transmitter according to any of the aspects outlined in the present document and an optical receiver according to any of the aspects outlined in the present document.

According to another aspect, an optical signal representative of a sequence of data symbols is described. The data symbols comprise respective phases and amplitudes. The phases of the data symbols correspond to the phases of constellation points of an $M^{ary}$—Phase Shift Keying (M-PSK) modulation scheme; with M being an integer, M>1. The amplitudes of the data symbols are substantially constant at a first amplitude, apart from every $N^{th}$ data symbol in the sequence of data symbols having a second amplitude higher than the first amplitude. The second amplitude may be substantially constant.

According to a further aspect, a method for enabling clock recovery at an optical receiver of an optical WDM transmission system is described. The method comprises generating a sequence of data symbols at a symbol rate B; with B being a real number greater than zero. The sequence of data symbols may be representative of input data. Furthermore, the method comprises modulating (e.g. modifying) an amplitude of every $N^{th}$ data symbol in a sequence derived from the sequence of data symbols, thereby creating a modulated sequence of data symbols; wherein N is an integer; wherein N>2. In addition, the method comprises converting a sequence derived from the modulated sequence of data symbols into an optical signal to be transmitted to the optical receiver.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

DESCRIPTION OF THE DRAWINGS

The invention is explained below in an exemplary manner with reference to the accompanying drawings, wherein

FIGS. 1b to 1e show spectra of example 112 Gb/s PDM-QPSK signals used for clock recovery;

FIG. 2b illustrates an example modulation scheme for improved clock recovery;

DETAILED DESCRIPTION

Optical communication systems typically comprise separate clocks (e.g. VCO, Voltage controlled oscillators) at their transmitters and receivers. The clocks at a transmitter and a receiver typically deviate from one another. This may have an impact on the performance of the communication link provided by the transmitter and the receiver. If the clock of the transmitter operates (and transmits data symbols) at a higher rate than the clock of the receiver, the receiver may miss out data symbols. On the other hand, if the clock of the transmitter operates at a lower rate than the clock of the receiver, the receiver may create copies of some of the data symbols. In any case, the mismatch of the clocks typically leads to an increased bit error rate and an increased outage probability of the communication link.

It is therefore desirable to adjust the clock at the receiver to the clock at the transmitter (or vice versa). In particular, it is desirable to recover clock (or timing) information from the received data symbols itself without the need for an explicit clock synchronization scheme.

In optical transmission systems data symbols are continuously transmitted from the transmitter to the receiver (in a so called circuit mode or a so called synchronous mode). As such, the receiver receives a continuous stream of data symbols at the symbol rate. The symbol rate corresponds to the clock at the transmitter. This means that the stream of data symbols comprises information regarding the clock at the transmitter and consequently, this clock information can be recovered at the receiver by determining the symbol rate from the continuous stream of data symbols.

Figure 1A:
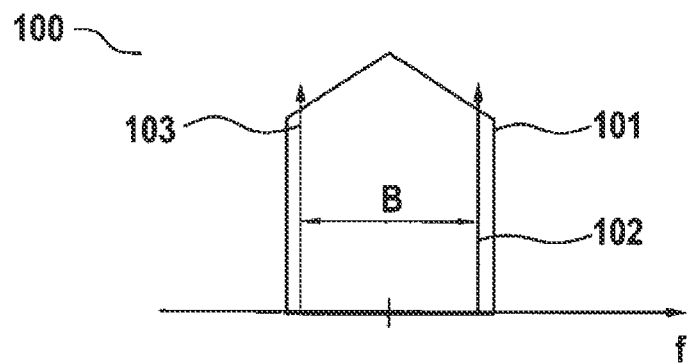
FIG. 1a illustrates the principle of an example clock recovery method.

The clock information may be extracted from the continuous stream of data symbols by analyzing the phase of spectral components which are located at half the symbol rate (i.e. by analyzing the phase of spectral components at −14 GHz and +14 GHz in case of a symbol rate of 28 Gbaud). This is illustrated in the frequency diagram 100 of FIG. 1a, where the spectrum 101 of a stream of data symbols is illustrated. In the illustrated example, the stream of data symbols has a symbol rate of B. The spectral components 103, 102 of the spectrum 101 at the frequencies −B/2 and +B/2, respectively, may be used to determine information regarding a difference of the clock frequency at the transmitter and the clock frequency at the receiver. In other words, the difference between the clock at the receiver and the clock at the transmitter can be determined by analyzing the spectrum of the received stream of data symbols at the frequency of −B/2 (reference numeral 103) and +B/2 (reference numeral 102). An example method for recovering the clock based on the spectrum of the received stream of symbols is described in M. Oerder and H. Meyr, "Digital Filter and Square Timing Recovery", IEEE Transactions on Communications, Vol. 36, No. 5, May 1988, pp. 605-612. This method is typically referred to as the "filter and square" method for clock recovery. The description of this method (notably section II of the above mentioned document) is incorporated by reference.

As indicated above, clock recovery methods (as e.g. the above mentioned filter and square method) typically analyze the spectrum of the received stream of data symbols at the frequencies of +/−B/2, wherein B is the symbol rate of the stream of data symbols. It has been observed that the information at this part of the spectrum may be corrupted by an imperfect phase response of transmitter and/or receiver optical filters and also by the crosstalk incurred on a particular WDM channel from adjacent WDM channels. This is particularly the case when narrow channel spacing is used (e.g. channel spacing in the range of B). Consequently, when reducing the width of WDM channels in order to increase the spectral efficiency of the WDM channels (i.e. in order to increase the capacity of the overall communication path), the performance of clock recovery decreases, due to increased corruption at the edges (i.e. at the frequencies +/−B/2) of the spectrum of the received stream of data symbols.

Figure 1B:
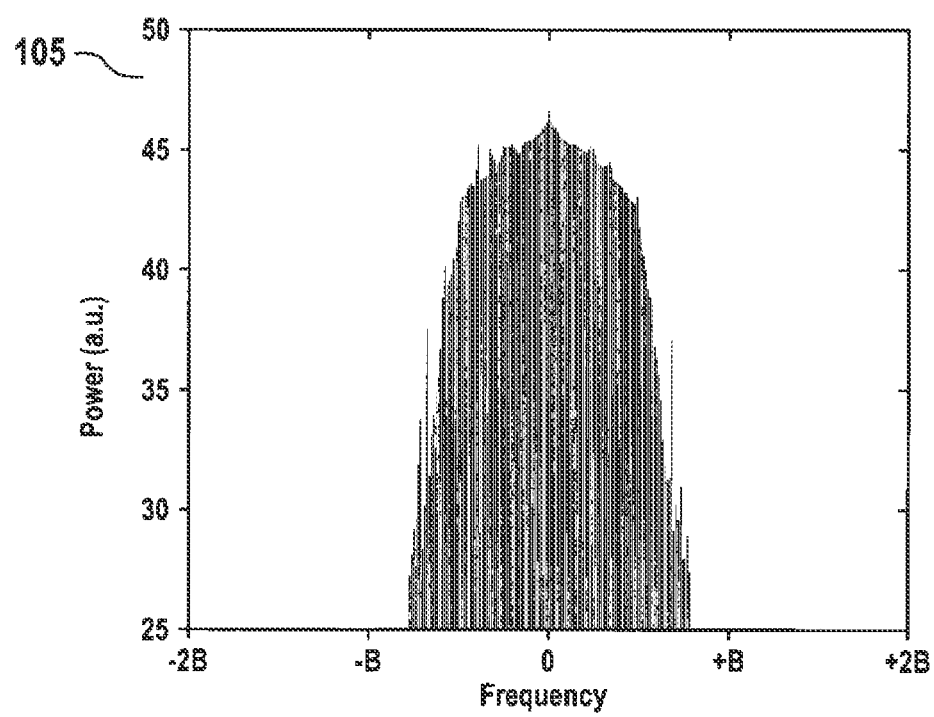
Figure 1C:
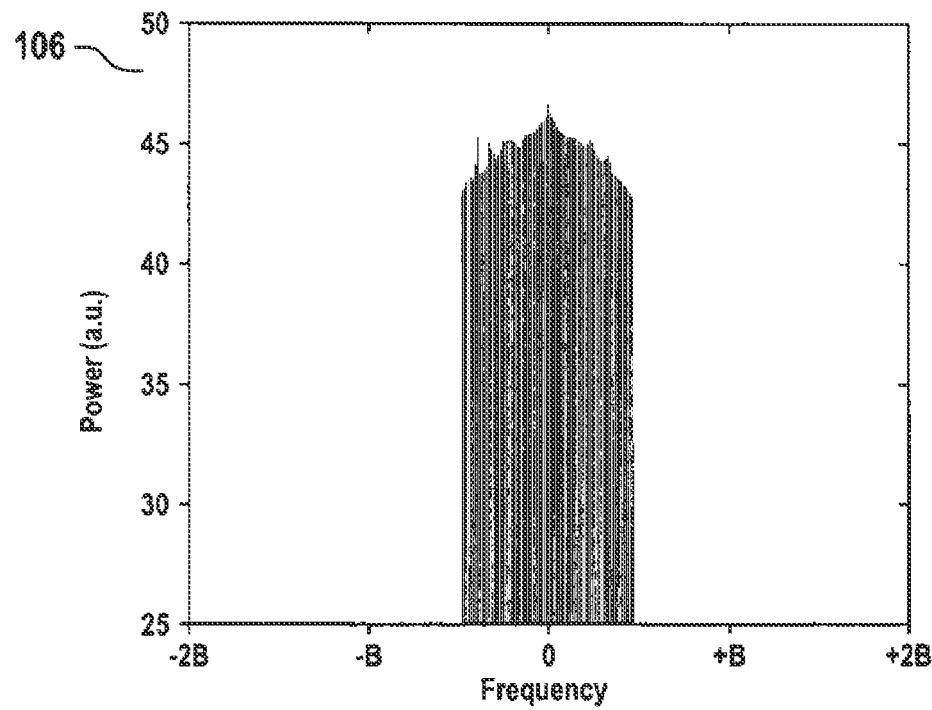
Figure 1D:
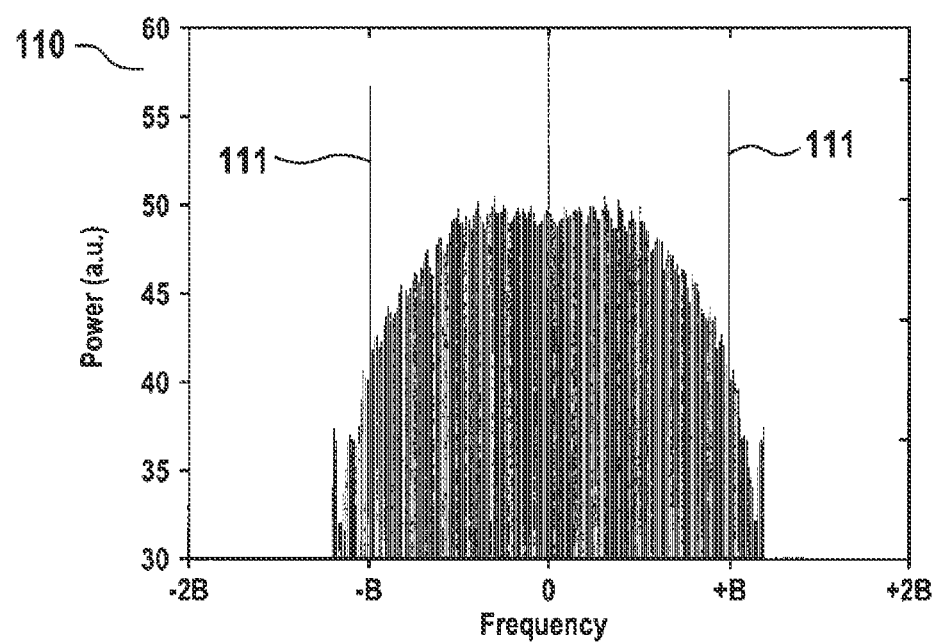

This is illustrated in FIGS. 1b to 1e. FIG. 1b shows the spectrum 105 of a 112 Gb/s PDM-QPSK signal subject to 50 GHz supergaussian optical filtering (i.e. subject to transmission over a WDM channel with a 50 GHz bandwidth) and subject to 16 GHz baseband electrical filtering of the ADC at the optical receiver. FIG. 1c shows the spectrum 106 of a 112 Gb/s PDM-QPSK signal subject to 25 GHz supergaussian optical filtering (i.e. subject to transmission over a WDM channel with a 25 GHz bandwidth) and subject to 16 GHz baseband electrical filtering of the ADC at the optical receiver. It can be seen that due to the optical filtering, the frequencies of the spectrum 106 are limited to +/−12.5 GHz (i.e. to +/−half of the bandwidth D of the WDM channel). In FIGS. 1b to 1e the frequencies +/−B correspond to +/−the symbol rate B. FIGS. 1d and 1e show the spectra 110, 120 of the squared 112 Gb/s PDM-QPSK signal subject to 50 GHz and 25 GHz optical filtering, respectively. The spectrum 110 comprises peaks 111 at the frequencies +/−B. These peaks 111 can be used to recover the clock. On the other hand, it can be seen that in case of 25 GHz supergaussian optical filtering due to a reduced channel spacing of 25 GHz (instead of 50 GHz) the resulting spectrum 120 of the squared 112 Gb/s PDM-QPSK signal is corrupted at +/−28 GHz (i.e. at +/−B in case of a symbol rate of B=28 Gbaud). In particular, it can be seen that the spectrum 120 does not comprise the peaks 111 at +/−B, such that clock recovery is not possible.

Figure 2A:
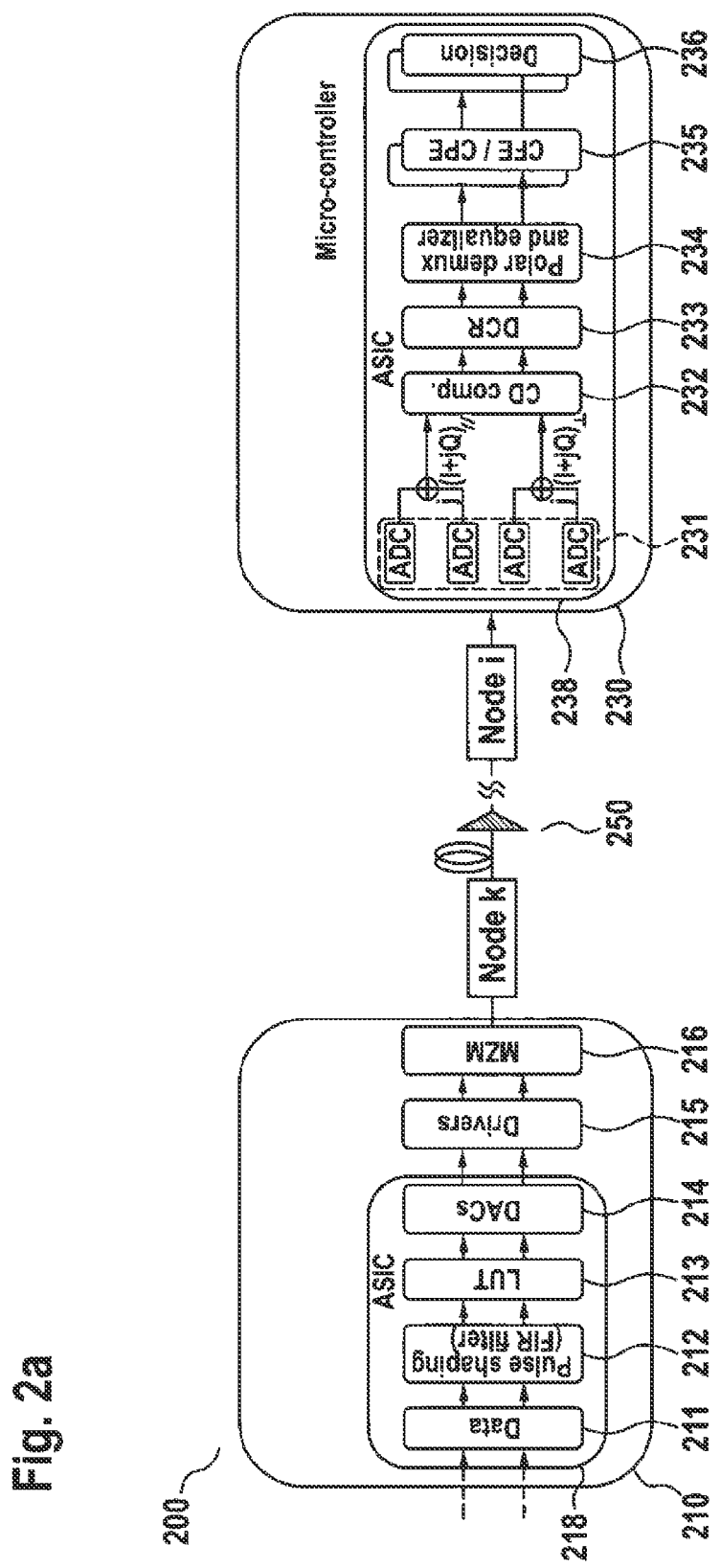
FIG. 2a shows the block diagram of an example optical transmission system.

FIG. 2a illustrates an example optical transmission system 200 comprising an optical transmitter 210, an optical transmission path 250 and an optical receiver 230. The transmitter 210 comprises a first digital signal processor 218, which may e.g. be implemented as an ASIC (Application-specific integrated circuit). In the illustrated example a transmitter 210 for polarization multiplexed optical signals is depicted. The first digital signal processor 218 provides two sequences of data symbols (e.g. QPSK symbols) for the two polarizations of the optical signal, respectively (within two symbol generation units 211). The two sequences of data symbols are filtered by a bank of two transmitter filters 212 (also referred to as pulse shaping filters) for the two polarizations of the optical signal, respectively. In an embodiment, the two transmitter filters 212 are identical, however, in other embodiments, the two transmitter filters 212 are specific for the respective polarizations of the optical signal. In addition, the transmitter 210 may comprise a Look Up Table (LUT) unit 213. The LUT unit 213 may be adapted to pre-emphasize the (modulated) sequence of data symbols in order to compensate for a nonlinear behaviour of the subsequent modulators 216. A pair of Digital-to-Analogue-Converters (DAC) 214 is used to convert the filtered sequences of data symbols 211 into a pair of electrical signals. The pair of electrical signals is used to modulate the two polarizations of the optical signal which is transmitted over the transmission path 250 (using drivers 215 and modulators 216, e.g. Mach-Zehnder-Modulators, MZM).

The optical receiver 230 illustrated in FIG. 2a is a coherent optical receiver which is configured to convert the received optical signal into a pair of complex digital signals, wherein each digital signal comprises an in-phase component and a quadrature-phase component. For this purpose, the coherent receiver may comprise a coherent detector and a bank of Analogue-to-Digital Converters (ADC) 231. Furthermore, the optical receiver 230 comprises a second digital signal processor 238 (e.g. an ASIC) which processes the pair of digital signals, in order to recover the two sequences of symbols in the decision units 236. The processing of the pair of digital signals typically comprises CD compensation 232, Digital Clock Recovery (DCR) 233, polarization demultiplexing 234 and carrier frequency/carrier phase estimation 235. The clock recovery unit 233 may perform a clock recovery method as outlined in the present document.

In the present document, a transmitter 210 is described which generates an optical signal (representative of or comprising a sequence of data symbols) for transmission to the optical receiver 230, wherein the optical signal allows for an improved clock recovery/timing recovery at the optical receiver 230. In particular, it is proposed to add a low speed tone to the sequence of data symbols at the transmitter side, wherein the low speed tone is preferably synchronous with the symbol rate. In an example case, a 7 GHz tone may be added to a 28 Gbaud signal when filtered in a 25 GHz grid respecting the condition 7 GHz<12.5 GHz.

In other words, it is proposed to add a repeating event into the stream of data symbols, wherein the repeating event has a frequency which is lower than the symbol rate. By way of example, the repeating event may have a frequency of B/N, wherein B is the symbol rate and wherein N is an integer, N>2, e.g. N=4. The frequency B/N of the repeating event may be smaller than half the bandwidth D of the transmission channel, i.e. B/N<D/2. By adding a repeating event at reduced frequency to the stream of data symbols, the clock recovery unit 233 at the optical receiver 230 is enabled to recover the clock by analyzing the spectrum of the received optical signal at frequencies lower than B/2, i.e. at frequencies which are less affected by distortions incurred on the optical transmission path 250. In particular, the clock recovery unit 233 is enabled to recover the clock by analyzing the spectrum of the received optical signal at the frequencies −B/N and/or +B/N, i.e. at the frequencies of the repeating event (also referred to as the tone or the clock tone).

FIG. 2b illustrates an example transmitter 210 which may be used to insert a repeating event at reduced frequency into the stream of data symbols. Furthermore, FIG. 2b illustrates a stream 260 of data symbols comprising a repeating event at a reduced frequency. A tone (or a repeating event) at reduced frequency (e.g. at B/4) may be inserted into the stream 260 of data symbols by increasing the amplitude of some of the data symbols in a repetitive manner. In the illustrated example, the amplitude of every fourth data symbol 262 is increased compared to the amplitude of the other data symbols 261. In other words, the amplitude of the data symbols 261, 262 is modulated, such that every fourth data symbol 262 has an increased amplitude. The extent of the difference between the default amplitude (of the conventional symbols 261) and the increased amplitude (of the emphasized symbols 262) may be referred to as the modulation depth. The values R/4, 3R/4, 5R/4 and 7R/4 in the symbols 261, 262 of FIG. 2b refer to the possible values of example QPSK symbols 261, 262.

The transmitter 210 of FIG. 2b comprises a tone insertion unit 220. In the illustrated example, the tone insertion unit 220 is configured to increase the amplitude of every $N^{th}$ data symbol 262. The tone insertion unit 220 may be positioned downstream of the pulse shaping filter unit 212. The tone information comprised within the stream 260 of data symbols may be used at the receiver 230 to lock the receiver clock onto the transmitter clock using for example the filter and square technique indicated above. For this purpose, the clock recovery unit 233 of the receiver 230 may analyze the spectral component of the spectrum of the received optical signal at the frequencies −B/N and +B/N. In case of N>2, these frequencies are typically unaffected by distortions incurred by the narrow channel spacing of the WDM channels. In other words, the tone information at reduced frequency enables clock recovery, even in cases of highly dense WDM channels.

Figure 2C:
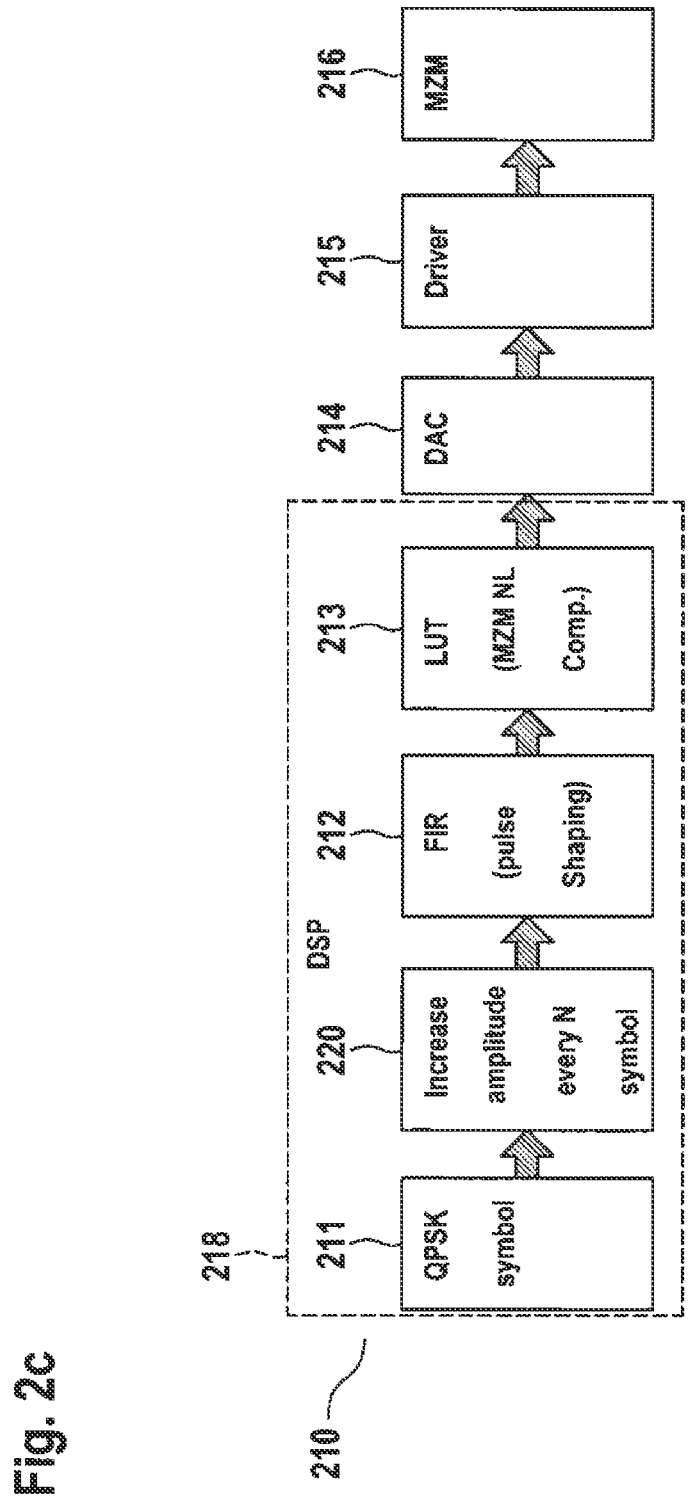
FIG. 2c illustrates another example modulation scheme for improved clock recovery.

FIG. 2c shows an example transmitter 210, wherein the tone insertion unit 220 is positioned upstream of the pulse shaping filter unit 212 (i.e. where tone insertion/amplitude modulation is performed prior to pulse shaping). This may be beneficial in order to improve the signal-to-noise ratio at the corresponding optical receiver 230, as the signal which is transmitted over the transmission path 250 is pulse shaped. On the other hand, the amplitude of the inserted clock tone may be reduced due to the filtering in the pulse shaping filter unit 212.

In the example of a 112 Gb/s PDM-QPSK transmission system 200 and in the example of an increase of the amplitude of every fourth (N=4) QPSK symbol 262, a tone at 7 GHz is generated by the transmitter 210 of FIG. 2b. It can be seen from the diagrams 300 and 310 of FIG. 3 that the tone at 7 GHz (reference numerals 301, 302, 311, 312) is detectable even in the presence of a strong filtering corresponding to the use of a (narrow) 25 GHz spacing grid, i.e. corresponding to the transmission via a WDM channel having a width of 25 GHz. In such cases, the ratio between the channel spacing (25 GHz) and the baud rate (28 GHz) is 0.89, i.e. smaller than 1. The diagrams 300 and 310 show the spectrum of the intensity of the received sequence of symbols of a 112 Gb/s PDM-QPSK optical signal in a 25 GHz WDM channel grid. In the illustrated example, the spectra of the squared signals are shown. In the case of diagram 300 the modulation depth for the 7 GHz clock tone was higher than in the case of diagram 310. In other words, the modulation depth in diagram 300 is higher than the modulation depth in diagram 310. It can be seen that the peaks 301, 302 at the tone frequency of 7 GHz increase within increasing modulation depth. Consequently, the performance of clock recovery at the receiver 230 increases with increasing modulation depth. Furthermore, it can be seen that even when determining the spectrum of the squared signal, the peaks 301, 302 are detectable at the tone frequency of B/N.

It should be noted that the performance of the clock recovery may be increased by averaging across succeeding blocks or frames of symbols. By way of example, the spectrum of a stream of symbols may be determined based on a block of succeeding symbols (e.g. a block of 1024 symbols). For this purpose, the block of symbols may be transformed into the frequency domain, e.g. using a Fast Fourier Transform (FFT). The spectra of a plurality of blocks of symbols (e.g. of 10 blocks of symbols) may be averaged, thereby increasing the performance for the extraction of the clock tone and for the clock recovery, even at relatively low modulation depths.

On the other hand, it should be noted that the insertion of a clock tone into the stream 260 of data symbols may impact the Optical Signal to Noise Ratio (OSNR) of the transmission system 200. The performance of the optical transmission system 200 for 112 Gb/s PDM-QPSK data may be analyzed. It can be shown that the insertion of a clock tone results only in a relatively small penalty, especially when using a relatively small modulation depth. Furthermore, it can be shown that the penalty decreases with decreasing modulation depth.

As such, the penalty added by the overmodulation (i.e. by the modulation of the amplitude of the symbols 262) is relatively small. This penalty is low compared to the penalty coming from intersymbol interference or from WDM crosstalk. Furthermore, the penalty due to overmodulation is relatively low compared to the OSNR penalty induced when changing the modulation format from QPSK to e.g. QAM16 in order to reduce the symbol rate at constant bit rate. The penalty when changing the modulation format is typically in the range of 7 dB or more. This means that the transmission of a PDM-QPSK signal at a symbol rate which is in the range of the width of the WDM transmission channel provide a higher performance than the transmission of signals using a constellation having a higher number of constellation points (e.g. QAM16), even when inserting a clock tone into the PDM-QPSK signal.

Figure 3:
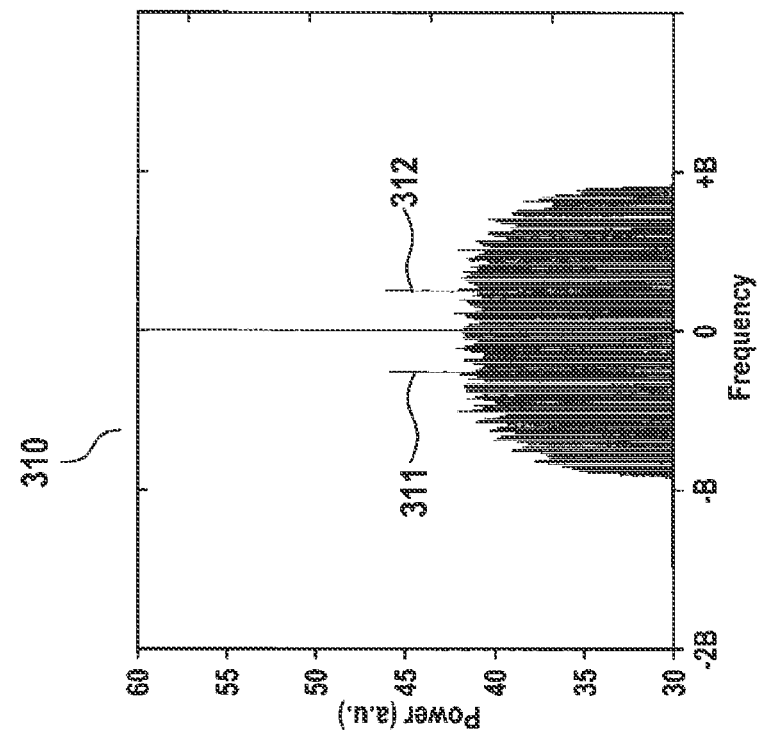
FIG. 3 shows optical spectra of example 112 Gb/s PDM-QPSK signals for improved clock recovery.
Figure 3:
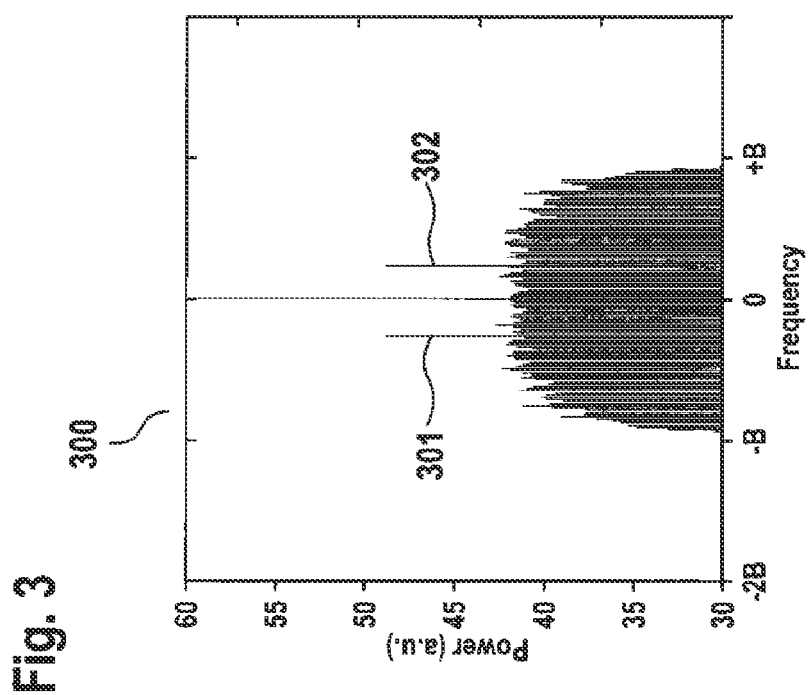

As can be seen from the diagrams 300, 310 of FIG. 3, the intensity spectrum of the stream 160 of data symbols comprises peaks 301, 302, 311, 312 at the frequencies −B/N and +B/N. Due to the presence of peaks 301, 302, 311, 31, the spectral component at the frequencies −B/N and +B/N may be extracted in a reliable manner. Furthermore the phase information of the spectral components at the frequencies −B/N and +B/N is less corrupted than the phase information of the spectral component at frequencies −B/2 and +B/2, if N>2. Hence, clock recovery methods (e.g. the filter and square method indicated above) can still be applied, even in the case of narrow filtering (e.g. when using a channel bandwidth which is smaller than the symbol rate). The objective of such clock recovery methods may be to measure the phase of the 7 GHz tone (i.e. the B/N tone) and to maintain the phase substantially constant by adjusting the clock frequency at the receiver 230. This can be done in the analogue signal domain or in the digital signal domain (the latter case being illustrated by the clock recovery unit 233 of FIG. 2a). The phase of the clock tone can be obtained by calculating the angle value of the Discrete Fourier Transform (DFT) of the spectral component at 7 GHz (i.e. at the frequency B/N).

It should be noted that as a result of inserting a clock tone, the computational complexity of the clock recovery methods can be reduced. It has been found that the inserted B/N clock tone can be recovered from the spectrum of the received signal directly, without the need to determine the spectrum of the received squared signal. Hence, clock recovery can be performed without the need of oversampling and squaring of the received signal, thereby reducing the computational complexity for clock recovery.

The creation of a stream 260 of symbols having symbols 261 at a first amplitude and symbols 262 at a second, increased, amplitude may be viewed as the overlay of conventional QPSK modulation (i.e. phase modulation) and amplitude modulation. The use of amplitude modulation may impact the Digital-to-Analogue Converter (DAC) 214 which needs to generate an analogue signal at an increased amplitude for every $N^{th}$ symbol. In other words, the DAC 214 may need to provide sufficient dynamic range and resolution to handle the symbols 261, 262 at different amplitudes.

In the present document, a scheme for enabling clock recovery in dense WDM transmission channels is described. The scheme allows a reliable clock recovery even in situations where the width of a WDM transmission channel lies in the range of the symbol rate of the data transmitted over the WDM transmission channel. The scheme makes use of the insertion of a clock tone into a stream of data symbols, wherein the clock tone has a frequency smaller than half the symbol rate of the stream of data symbols.

As a result of a reliable clock recovery, narrow WDM channel spacing may be used in order to increase the number of WDM channels which can pass within an optical amplifier. This means that the proposed clock recovery scheme enables the increase of the throughput of optical transmission systems. The proposed scheme is particularly interesting for undersea optical transmission systems, but also for terrestrial optical transmission systems, e.g. using gridless or variable bandwidth ROADM (Reconfigurable Optical Add Drop Multiplexers).

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An optical transmitter adapted to transmit an optical signal on an optical wavelength division multiplexed (WDM) transmission channel to a corresponding optical receiver, the optical transmitter comprising:

a symbol generation unit adapted to convert input data into a sequence of data symbols at a symbol rate B; with B being a real number greater zero; wherein phases of the sequence of data symbols correspond to phases of constellations points of an $M^{ary}$-Phase Shift Keying modulation scheme; with M being an integer, M>1;

an amplitude modulation unit adapted to modulate an amplitude of every $N^{th}$ data symbol in a sequence derived from the sequence of data symbols, thereby creating a modulated sequence of data symbols; wherein N is an integer; and wherein N>2; and wherein the amplitudes of the data symbols of the modulated sequence are constant at a first amplitude, apart from every $N^{th}$ data symbol in the modulated sequence of data symbols having a second amplitude other than the first amplitude; and wherein the second amplitude is higher than the first amplitude; and a digital-to-optical converter adapted to convert a sequence derived from the modulated sequence of data symbols into an optical signal to be transmitted to the optical receiver.

2. The optical transmitter of claim 1, wherein M=4 for Quadrature Phase Shift Keying.

3. The optical transmitter of claim 1, wherein
the WDM transmission channel has a bandwidth D; and
N is such that B/N is smaller than D/2.

4. The optical transmitter of claim 1, wherein a ratio between the first amplitude and the second amplitude is adjustable.

5. The optical transmitter of claim 1, wherein the digital-to-optical converter comprises a digital-to-analogue converter adapted to convert the sequence derived from the modulated sequence of data symbols into an analogue electrical signal.

6. The optical transmitter of claim 5, wherein the digital-to-optical converter comprises an optical modulator adapted to modulate an optical carrier signal with the analogue electrical signal, thereby yielding the optical signal.

7. The optical transmitter of claim 1, further comprising a pulse shaping filter, wherein the pulse shaping filter
is positioned upstream of the amplitude modulation unit and adapted to filter the sequence of data symbols; or
is positioned downstream of the amplitude modulation unit and adapted to filter the modulated sequence of data symbols.

8. The optical transmitter of claim 1, wherein the optical transmitter is adapted to generate a polarization division multiplexed (PDM) optical signal that comprises a first polarization component and a second polarization component.

9. The optical transmitter of claim 1, wherein a bandwidth D of the WDM transmission channel is smaller than or equal to the symbol rate B.

10. An optical transmission system adapted for wavelength division multiplexed (WDM) transmission, the optical transmission system comprising:
an optical transmitter according to claim 1; and
an optical receiver comprising:
a reception unit adapted to convert an optical signal received from the optical transmitter into an analogue or digital signal; wherein the analogue or digital signal is representative of a sequence of data symbols at a symbol rate B; with B being a real number greater zero; and wherein phases of the sequence of data symbols correspond to phases of constellations points of an $M^{ary}$-Phase Shift Keying modulation scheme; with M being an integer, M>1; and wherein an amplitude of every $N^{th}$ data symbol in the sequence of data symbols is greater than the amplitude of the other data symbols in the sequence of data symbols; N being a real number, N>2; and
a clock recovery unit adapted to adjust a clock of the optical receiver to a clock of the transmitter, based on a spectrum of the analogue or digital signal at frequencies of substantially −B/N and/or +B/N.

11. An optical receiver adapted to receive an optical signal on an optical wavelength division multiplexed (WDM) transmission channel from a corresponding optical transmitter, the optical receiver comprising:
a reception unit adapted to convert the optical signal received from the optical transmitter into an analogue or digital signal; wherein the analogue or digital signal is representative of a sequence of data symbols at a symbol rate B; with B being a real number greater zero; and wherein phases of the sequence of data symbols correspond to phases of constellations points of an Mary-Phase Shift Keying modulation scheme; with M being an integer, M>1; and wherein an amplitude of every Nth data symbol in the sequence of data symbols is greater than the amplitude of the other data symbols in the sequence of data symbols; N being a real number, N>2; and
a clock recovery unit adapted to adjust a clock of the optical receiver to a clock of the transmitter, based on a spectrum of the analogue or digital signal at frequencies of substantially −B/N and/or +B/N.

12. The optical receiver of claim 11, wherein the clock recovery unit is adapted to apply a filter and square method to spectral components of the analogue or digital signal at the frequencies of substantially −B/N and +B/N.

13. A method for enabling clock recovery at an optical receiver of an optical wavelength division multiplexed (WDM) transmission system, the method comprising:
generating a sequence of data symbols at a symbol rate B; with B being a real number greater zero; wherein the sequence of data symbols is representative of input data; and wherein phases of the sequence of data symbols correspond to phases of constellations points of an $M^{ary}$-Phase Shift Keying modulation scheme; with M being an integer, M>1;
modulating an amplitude of every $N^{th}$ data symbol in a sequence derived from the sequence of data symbols, thereby creating a modulated sequence of data symbols; wherein N is an integer; and wherein N>2; and wherein the amplitudes of the data symbols of the modulated sequence are constant at a first amplitude, apart from every $N^{th}$ data symbol in the modulated sequence of data symbols having a second amplitude other than the first amplitude; and wherein the second amplitude is higher than the first amplitude; and
converting a sequence derived from the modulated sequence of data symbols into an optical signal to be transmitted to the optical receiver.

14. An optical signal for an optical wavelength division multiplexed (WDM) transmission channel; wherein the optical signal is representative of a sequence of data symbols, and wherein
the data symbols comprise respective phases and amplitudes;
the phases of the data symbols correspond to the phases of constellation points of an $M^{ary}$-Phase Shift Keying (M-PSK) modulation scheme; with M being an integer, M>1; and
the amplitudes of the data symbols are constant at a first amplitude, apart from every $N^{th}$ data symbol in the sequence of data symbols having a second amplitude other than the first amplitude; wherein the second amplitude is higher than the first amplitude.

15. An optical transmission system adapted for wavelength division multiplexed (WDM) transmission, the optical transmission system comprising:
an optical transmitter; and
an optical receiver comprising:
a reception unit adapted to convert an optical signal received from the optical transmitter into an analogue or digital signal; wherein the analogue or digital signal is representative of a sequence of data symbols at a symbol rate B; with B being a real number greater zero; and wherein phases of the sequence of data symbols correspond to phases of constellations points of an $M^{ary}$-Phase Shift Keying modulation scheme; with M being an integer, M>1; and wherein an amplitude of every $N^{th}$ data symbol in the sequence of data symbols is greater than the amplitude of the other data symbols in the sequence of data symbols; N being a real number, N>2; and a clock recovery unit adapted to adjust a clock of the optical receiver to a clock of the transmitter, based on a spectrum of the analogue or digital signal at frequencies of substantially −B/N and/or +B/N.

\* \* \* \* \*